(12) United States Patent
Sanada et al.

(10) Patent No.: US 7,862,653 B2
(45) Date of Patent: *Jan. 4, 2011

(54) AQUEOUS INK, INK JET RECORDING METHOD, INK CARTRIDGE, RECORDING UNIT AND INK JET RECORDING APPARATUS

(75) Inventors: Mikio Sanada, Kawasaki (JP); Kenji Moribe, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/740,591

(22) Filed: Apr. 26, 2007

(65) Prior Publication Data

US 2007/0252881 A1 Nov. 1, 2007

Related U.S. Application Data

(63) Continuation of application No. PCT/JP2006/323258, filed on Nov. 15, 2006.

(30) Foreign Application Priority Data

Nov. 16, 2005 (JP) .............................. 2005-331703
Nov. 14, 2006 (JP) .............................. 2006-307758

(51) Int. Cl.
*C09D 11/02* (2006.01)
(52) U.S. Cl. ................ 106/31.27; 106/31.6; 106/31.89; 106/31.59
(58) Field of Classification Search ............... 106/31.27, 106/31.6, 31.89, 31.59
See application file for complete search history.

(56) References Cited

U.S. PATENT DOCUMENTS

| 5,451,251 A | 9/1995 | Mafune et al. ............ 106/22 H |
| 5,571,313 A | 11/1996 | Mafune et al. ............ 106/22 H |
| 5,785,746 A | 7/1998 | Kito et al. |
| 5,911,815 A | 6/1999 | Yamamoto et al. ........ 106/31.27 |
| 6,027,210 A | 2/2000 | Kurabayashi et al. ........ 347/100 |
| 6,153,001 A * | 11/2000 | Suzuki et al. ............ 106/31.65 |
| 6,174,354 B1 | 1/2001 | Takizawa et al. ......... 106/31.43 |

(Continued)

FOREIGN PATENT DOCUMENTS

CN 1162610 A 10/1997

(Continued)

OTHER PUBLICATIONS

Nonylphenol Ethoxylate product indentification, pp. 1-4.*

(Continued)

*Primary Examiner*—Jerry Lorengo
*Assistant Examiner*—Veronica Faison Gee
(74) *Attorney, Agent, or Firm*—Fitzpatrick, Cella, Harper & Scinto

(57) ABSTRACT

Novel conditions in the physical properties of an ink have been found out to provide an aqueous ink, which can give a high image density and achieve excellent fixing ability. The aqueous ink comprises at least water, a water-soluble organic solvent, a surfactant and a coloring material, wherein the dynamic surface tension at a lifetime of 50 milliseconds as determined by a maximum bubble pressure method is 49 mN/m or more, and the dynamic surface tension at a lifetime of 5,000 milliseconds as determined by the maximum bubble pressure method is 38 mN/m or less.

10 Claims, 4 Drawing Sheets

U.S. PATENT DOCUMENTS

| | | | |
|---|---|---|---|
| 6,221,141 B1 | 4/2001 | Takada et al. | 106/31.6 |
| 6,280,513 B1 * | 8/2001 | Osumi et al. | 106/31.6 |
| 6,332,919 B2 | 12/2001 | Osumi et al. | 106/31.6 |
| 6,375,317 B1 | 4/2002 | Osumi et al. | 347/100 |
| 6,425,662 B1 | 7/2002 | Teraoka et al. | 347/100 |
| 6,461,418 B1 * | 10/2002 | Yue et al. | 106/31.58 |
| 6,511,534 B1 | 1/2003 | Mishina et al. | 106/31.33 |
| 6,706,105 B2 | 3/2004 | Takada et al. | 106/31.6 |
| 7,005,461 B2 | 2/2006 | Sanada et al. | 523/160 |
| 7,037,362 B2 | 5/2006 | Honma et al. | 106/31.13 |
| 7,141,107 B2 | 11/2006 | Honma et al. | 106/31.58 |
| 7,160,376 B2 | 1/2007 | Watanabe et al. | 106/31.6 |
| 7,276,110 B2 | 10/2007 | Tsujimura et al. | 106/31.27 |
| 2002/0014611 A1 | 2/2002 | Taylor et al. | |
| 2003/0179268 A1 * | 9/2003 | Koga et al. | 347/100 |
| 2003/0200897 A1 * | 10/2003 | Nakatsu et al. | 106/31.58 |
| 2004/0103815 A1 | 6/2004 | Honma et al. | 106/31.13 |
| 2005/0024458 A1 | 2/2005 | Sanada et al. | 347/100 |
| 2006/0066699 A1 | 3/2006 | Tokuda et al. | 347/100 |
| 2006/0089424 A1 | 4/2006 | Sanada et al. | 523/160 |
| 2006/0098067 A1 | 5/2006 | Imai et al. | 347/100 |
| 2006/0098068 A1 | 5/2006 | Hakamada et al. | 347/100 |
| 2006/0100311 A1 | 5/2006 | Tokuda et al. | 523/160 |
| 2006/0103703 A1 | 5/2006 | Nito et al. | 347/100 |
| 2006/0103704 A1 | 5/2006 | Hakamada et al. | 347/100 |
| 2006/0135647 A1 | 6/2006 | Ichinose et al. | 523/160 |
| 2007/0097155 A1 | 5/2007 | Imai et al. | 347/1 |
| 2007/0097156 A1 | 5/2007 | Udagawa et al. | 347/1 |
| 2007/0112095 A1 | 5/2007 | Moribe et al. | 523/160 |
| 2007/0252868 A1 | 11/2007 | Sanada et al. | 347/33 |
| 2008/0018722 A1 | 1/2008 | Mafune et al. | 347/100 |

FOREIGN PATENT DOCUMENTS

| | | |
|---|---|---|
| EP | 1 473 340 A1 | 11/2004 |
| JP | 2516218 | 4/1996 |
| JP | 2003-231838 | 8/2003 |
| JP | 2003-238851 | 8/2003 |
| JP | 2005-200566 | 7/2005 |
| JP | 2006-63322 | 3/2006 |
| JP | 2006-219625 | 8/2006 |
| WO | WO 03/066758 | 8/2003 |
| WO | WO 2006067583 A1 * | 6/2006 |

OTHER PUBLICATIONS

Supplementary European Search Report in EP 06 83 3099, dated Nov. 26, 2008.

Apr. 13 2010 Chinese Official Action in Chinese Patent Application No. 200680043054.X (with translation).

International Preliminary Report on Patentability with Written Opinion in PCT/JP2006/323258 (with translation).

* cited by examiner

AQUEOUS INK, INK JET RECORDING METHOD, INK CARTRIDGE, RECORDING UNIT AND INK JET RECORDING APPARATUS

This application is a continuation of International Application No. PCT/JP2006/323258 filed Nov. 15, 2006, which claims the benefit of Japanese Patent Application No. 2005-331703 filed Nov. 16, 2005 and Japanese Patent Application No. 2006-307758 filed Nov. 14, 2006.

BACKGROUND OF THE INVENTION

1. Field of the Invention

The present invention relates to an aqueous ink, and an ink jet recording method, an ink cartridge, a recording unit and an ink jet recording apparatus using such an aqueous ink.

2. Description of the Related Art

An ink used in ink jet recording systems is required to be an ink giving a high image density (OD value) for the purpose of achieving high image quality. In addition, an ink, which prevents recording media from being stained even when recording is continuously conducted, i.e., has excellent fixing ability, is required for the purpose of achieving speeding-up.

Various techniques have been proposed to date for the purpose of enhancing the image density. For example, they include a technique of using a coloring material excellent in color developability and a technique of composing the composition of an ink to enhance the associated state or aggregating ability of a coloring material, thereby leaving a greater amount of the coloring material on the surface of a recording medium.

There is a proposal of paying attention to the dynamic surface tension of an ink as a technique for controlling permeation of the ink into a recording medium or blurring of the ink. For example, Japanese Patent Registration No. 2516218 (Patent Document 1) has proposed the provision of an ink excellent in drying ability by controlling [dynamic surface tension (dyn/cm) at a life time of 0 millisecond+viscosity (cp)] within a range of from 42 to 49. Japanese Patent Application Laid-Open No. 2003-238851 (Patent Document 2) has proposed the provision of an ink of which the maximum value of the rate of change of the dynamic surface tension is from 0.2 mN/m/s to 0.4 mN/m/s. Japanese Patent Application Laid-Open No. 2005-200566 (Patent Document 3) has proposed the provision of an ink having a dynamic surface tension of from 25 to 50 mN/m at a lifetime of 10 milliseconds, in which the difference between the maximum value and the minimum value of the dynamic surface tension is 5 mN/m or less. Japanese Patent Application Laid-Open No. 2003-231838 (Patent Document 4) has proposed the provision of an ink having a dry viscosity of 100 mPa·s or less, a dynamic surface tension of at least 45 mN/m in the lifetime of 10 milliseconds and a dynamic surface tension of 35 mN/m or less at a lifetime of 1,000 milliseconds.

SUMMARY OF THE INVENTION

However, it is mainly conducted to control the properties of a coloring material in the conventional techniques of enhancing the image density of an image. Therefore, when a recording medium, which tends to cause association or aggregation of a coloring material with the permeation of an ink, i.e., a recording medium having coarse texture and a lot of voids is used, a sufficient image density may not be achieved in some cases. In other words, it is an object to achieve a high image density by causing a great amount of a coloring material to exist on the surface of a recording medium for various kinds of recording media.

As another technique for achieving a high image density, there is also a method of enhancing image density by inhibiting the permeation of an ink into a recording medium to cause a great amount of a coloring material to exist on the surface of the recording medium. However, when a recording medium having fine texture and a small amount of voids is used, even the use of such a technique as described above cannot suffice regarding the fixing ability of the ink. In other words, it is another object to improve the fixing ability of the ink for various kinds of recording media.

The present inventors have analyzed the mechanism of the formation of an image with a view toward achieving the above objects and made efforts for finding out dominating technical factors for achieving these objects. As a result, it has been found that it is important to control permeating speed of an ink into a recording medium from the beginning of evaporation of the ink on the recording medium to the end of fixing of the ink to the recording medium.

It is accordingly an object of the present invention to find out novel conditions in the properties of an ink to provide an aqueous ink (hereinafter may also be referred to as "ink" merely) which can give a high image density as an ink jet ink and achieve excellent fixing ability. Another object of the present invention is to provide an ink jet recording method, an ink cartridge, a recording unit and an ink jet recording apparatus using such an aqueous ink.

The above objects can be achieved by the present invention described below. More specifically, an aqueous ink according to the present invention comprises at least water, a water-soluble organic solvent, a surfactant and a coloring material, wherein a dynamic surface tension at a lifetime of 50 milliseconds as determined by a maximum bubble pressure method is 49 mN/m or more, and wherein a dynamic surface tension at a lifetime of 5,000 milliseconds as determined by the maximum bubble pressure method is 38 mN/m or less.

An ink jet recording method according to another embodiment of the present invention comprises ejecting an ink by an ink jet system to conduct recording on a recording medium, wherein the ink is the aqueous ink of the above-described constitution.

An ink cartridge according to a further embodiment of the present invention comprises an ink storage portion for storing an ink, wherein the ink is the aqueous ink of the above-described constitution.

A recording unit according to a still further embodiment of the present invention comprises an ink storage portion for storing an ink and a recording head for ejecting the ink, wherein the ink is the aqueous ink of the above-described constitution.

An ink jet recording apparatus according to a yet still further embodiment of the present invention comprises an ink storage portion for storing an ink and a recording head for ejecting the ink, wherein the ink is the aqueous ink of the above-described constitution.

According to the present invention, there can be provided an aqueous ink capable of giving a high image density and achieving excellent fixing ability. According to another embodiment of the present invention, there can be provided an ink jet recording method, an ink cartridge, a recording unit and an ink jet recording apparatus using such an aqueous ink.

Further features of the present invention will become apparent from the following description of exemplary embodiments with reference to the attached drawings.

DESCRIPTION OF THE EMBODIMENTS

Figure 1:
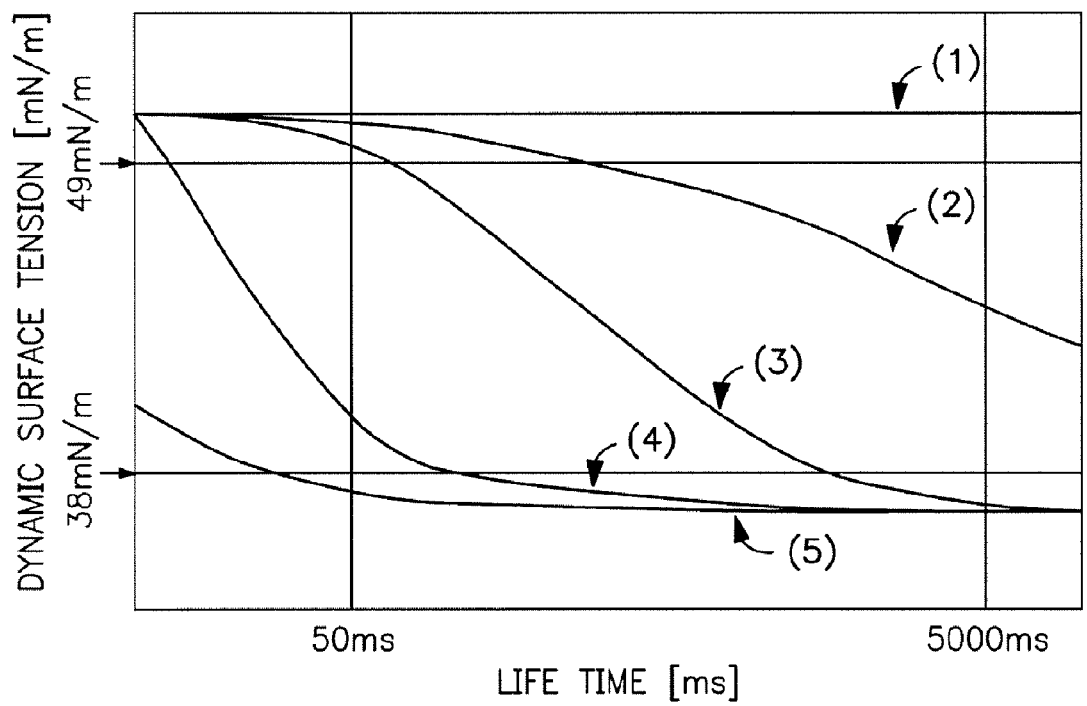
FIG. 1 illustrates examples of a condition where the dynamic surface tension of an ink changes.

The present invention will hereinafter be described in more detail by the best mode for carrying out the invention. Incidentally, the dynamic surface tension in the present invention is a value measured at 25° C.

A technical idea of the present invention is to keep the dynamic surface tension of an ink at a certain value or more for a period of time from the application of the ink to a recording medium to the occurrence of a change in state of the ink (viscosity increase of the ink, association or aggregation of a coloring material) by evaporation or the like of the ink. As a result, the permeation of the ink into the recording medium is inhibited, whereby the coloring material can be caused to effectively exist on the surface of the recording medium.

Another technical idea of the present invention is to lower the surface tension of an ink to a certain value through a change in the lifetime of the ink after some time period has elapsed from the application of the ink to a recording medium for the purpose of improving the fixing ability of the ink.

Some proposals of inks obtained by paying attention to the dynamic surface tension like Patent Documents 1 to 4 have been made to date. However, even in the techniques of these proposals, any investigation about what change in state an ink causes during the process from the application of an ink to a recording medium to the permeation of the ink is not made at all. In other words, high image density sought by the present inventors cannot be achieved unless a phenomenon occurring in a recording medium is considered, as in the techniques described in Patent Documents 1 to 4, i.e., cannot be achieved by the mere definition of physical properties of the ink.

For example, the techniques described in Patent Documents 1 and 2 are a technique relating to how to lower the surface tension of an ink during a short lifetime to enhance the permeability of the ink into the recording medium. In these techniques, there is no investigation about what influence the dynamic surface tension right after the ink is applied to the recording medium exerts on the formation of an image. Therefore, even when the inks described in Patent Documents 1 and 2 are used, achieving the above-described objects of the present invention is considered to be impossible.

Patent Documents 3 and 4 define the dynamic surface tension at a lifetime of 10 milliseconds and varied values of the dynamic surface tension. Then, the present inventors have prepared an ink satisfying the conditions described in Patent Documents 3 and 4 and measured the image density of an image formed with such an ink. As a result, it has been unable to achieve the image density of the level sought by the present inventors. The reason for it is that the evaporation of the ink scarcely takes place at a lifetime of 10 milliseconds, and so a change in state of the ink (viscosity increase of the ink, association or aggregation of a coloring material) does not occur to the extent that the image density can be enhanced on a recording medium. In other words, in the technique described in Patent Documents 3 and 4, no change in state of the ink on the recording medium is considered, so the value of the dynamic surface tension at a lifetime of 10 milliseconds is considered to be a value making no sense in terms of enhancing the image density.

The value of 45 mN/m of the dynamic surface tension at a lifetime of 10 milliseconds in Patent Document 4 is too low to inhibit the permeation of an ink into a recording medium having coarse texture and a lot of voids. Even from this point of view, the object of the technique described in Patent Document 4 is to control the permeation speed of an ink into a recording medium to provide such an ink as not to cause too much blurring and to have moderate permeability. As a result of an investigation as to the ink described in Patent Document 4 by the present inventors, it has been found that sufficient image density and fixing ability cannot be achieved by such an ink.

The present inventors have recognized that it is necessary to control the dynamic surface tension value of an ink in consideration of the influence exerted on the image properties by a dynamic surface tension value right after an ink whose dynamic surface tension varies according to the lifetime is applied to a recording medium for achieving the objects of the present invention.

The present inventors have carried out an investigation as to the behavior of evaporation of an ink and its permeation into a recording medium. As a result, it has been found that the following condition is required to cause a coloring material to effectively exist on the surface of a recording medium. Namely, it is necessary to keep the dynamic surface tension of an ink high for a period of time from the application of the ink to a recording medium to the occurrence of such a change in state of the ink (viscosity increase of the ink, association or aggregation of a coloring material) that the image density can be enhanced, so as to prevent the ink from permeating into the recording medium. It has thus been found that it is only necessary to keep the dynamic surface tension of the ink to 49 mN/m or more at least at a lifetime of 50 milliseconds. It has also been found that both high image density and excellent fixing ability can be achieved by lowering the dynamic surface tension at a long lifetime, specifically, making large the difference between the dynamic surface tension values at a lifetime of 50 milliseconds and that at a lifetime of 5,000 milliseconds, thus leading to completion of the present invention.

The ink according to the present invention is an ink whose dynamic surface tension varies with lifetime, wherein the dynamic surface tension of the ink is 49 mN/m or more at a lifetime of 50 milliseconds as determined by a maximum bubble pressure method. This means that the dynamic surface tension of the ink for a period of time from the application of the ink to a recording medium to the occurrence of such a change in state of the ink that the image density can be enhanced, i.e., at a lifetime of 50 milliseconds as determined by the maximum bubble pressure method, is 49 mN/m or more. The ink according to the present invention is characterized in that the dynamic surface tension of the ink at a lifetime of 5,000 milliseconds as determined by the maximum bubble pressure method is 38 mN/m or less as will be described below.

What influence the dynamic surface tension value at a lifetime of 50 milliseconds exerts on the image density and fixing ability will hereinafter be described.

FIG. 1 illustrates examples of conditions where the dynamic surface tension of an ink changes. In FIG. 1, reference numeral (1) designates an ink that keeps a dynamic surface tension 49 mN/m or more throughout the time change. Reference numerals (2) and (3) indicate inks of which the dynamic surface tension in the lifetime of 50 milliseconds is 49 mN/m or more and of which the dynamic surface tension lowers with time change. In these inks, the dynamic surface tension of the ink of (3) more greatly changes with time change, so the dynamic surface tension at a lifetime of 5,000 milliseconds becomes 38 mN/m or less. Reference numeral (4) is an ink of which the dynamic surface tension is 49 mN/m or more at an extremely short lifetime but of which the dynamic surface tension greatly changes with time change, the dynamic surface tension at a lifetime of 50 milliseconds becomes less than 49 mN/m, and the dynamic surface tension lowers with time change even after this. Reference numeral (5) is an ink of which the dynamic surface tension is already low at an extremely short lifetime and the dynamic surface tension lowers with time changes even after this.

The inks having such properties in dynamic surface tension change as described above are different from one another in condition of the inks on a recording medium at a lifetime of 50 milliseconds. The inks of (1), (2) and (3) in FIG. 1 have a dynamic surface tension 49 mN/m or more at a lifetime of 50 milliseconds. When the dynamic surface tension at a lifetime of 50 milliseconds is 49 mN/m or more, the permeation of such an ink into a recording medium can be inhibited even when the recording medium has coarse texture and a lot of voids, i.e., has high permeability. According to the investigation by the present inventors, this is considered to be attributable to the following mechanism. Namely, the dynamic surface tension of an ink is kept to 49 mN/m or more for a period of time to cause such a change in state of the ink (viscosity increase of the ink, association or aggregation of a coloring material) that the image density can be enhanced, i.e., at the time when 50 milliseconds have elapsed from the application of the ink to a recording medium. A coloring material can be thereby caused to effectively exist on the surface of the recording medium. According to the mechanism described above, an ink having properties like those of (1), (2) and (3) can achieve high image density even on a recording medium having coarse texture and a lot of voids, i.e., having high permeability.

On the other hand, the dynamic surface tensions of the inks (4) and (5) are less than 49 mN/m before 50 milliseconds elapse from the application of the inks to a recording medium. When such an ink is applied to a recording medium having coarse texture and a lot of voids, i.e., having high permeability, permeation of the ink into the recording medium starts before a change in state of the ink (viscosity increase of the ink, association or aggregation of a coloring material) occurs. As a result, a coloring material cannot be caused to effectively exist on the surface of the recording medium. In other words, an ink having properties like those of (4) and (5) lead to low image density when the recording medium having coarse texture and a lot of voids, i.e., having high permeability is used.

In other words, the dynamic surface tension of an ink at a lifetime of 50 milliseconds as determined by the maximum bubble pressure method is controlled to 49 mN/m or more, whereby the coloring material can be caused to effectively exist on the surface of a recording medium even when the recording medium has coarse texture and a lot of voids, i.e., has high permeability, and so high image density can be achieved.

In order to improve the fixing ability of an ink, i.e., accelerate the fixing speed thereof, it is preferable that the dynamic surface tension of the ink be lowered with time change. It is more preferable that the dynamic surface tension of the ink at a lifetime of 5,000 milliseconds as determined by the maximum bubble pressure method be 38 mN/m or less. The reason for it is that when the dynamic surface tension of the ink at a lifetime of 5,000 milliseconds is 38 mN/m or less, an excessive liquid component existing on the surface of a recording medium can be permeated into the recording medium at a high speed even when the recording medium has fine texture and a small amount of voids, and so the fixing rate can be made high. Accordingly, among the inks (1), (2) and (3) in FIG. 1, by which high image density can be achieved, the inks (2) and (3), whose dynamic surface tensions lower, are preferred for the purpose of accelerating the fixing rate. In the present invention, thus, the ink (3), whose dynamic surface tension at a lifetime of 5,000 milliseconds is 38 mN/m or less, is preferred.

It is further preferable that the difference between the dynamic surface tensions at a lifetime of 50 milliseconds and that at a lifetime of 5,000 milliseconds as determined by the maximum bubble pressure method is made large, specifically, the difference is 15 mN/m or more. Both high image density and excellent fixing ability of ink can be achieved for various kinds of recording media.

The maximum bubble pressure method used in the measurement of dynamic surface tension in the present invention will now be described. The maximum bubble pressure method is a method in which a maximum pressure required to release a bubble formed at a tip portion of a probe (capillary) dipped in a liquid to be measured is measured, and then the surface tension is found from this maximum pressure. The lifetime means a time period from a point of time when a surface of a new bubble is formed after a bubble is released from the tip portion to a point of time of a maximum bubble pressure (a point of time when the curvature radius of the bubble becomes equal to the radius of the tip portion of the probe) upon the formation of the bubble at the tip portion of the probe in the maximum bubble pressure method.

Incidentally, the dynamic surface tension at a lifetime of 5,000 milliseconds as determined by the maximum bubble pressure method becomes a high value compared with a static surface tension generally used, i.e., a surface tension value as determined by the Wilhelmy method (plate method). According to the static surface tension as determined, the properties of having both excellent image density and excellent fixing ability may not be sufficiently represented in some cases. Therefore, it is necessary in the present invention to control the dynamic surface tensions at a lifetime of 50 milliseconds and a lifetime of 5,000 milliseconds as determined by the maximum bubble pressure method, not the static surface tension.

<Ink>

The ink according to the present invention is characterized by suitably combining the kinds and contents of permeating agents, i.e., a surfactant and a water-soluble organic solvent, to have the properties of the dynamic surface tension as described above. For the rest, it is only necessary to use the same constitution as that of a conventional ink. The respective components making up the ink according to the present invention will hereinafter be described.

(Permeating Agents)

The ink according to the present invention is required to contain a surfactant and an aqueous organic solvent as permeating agents. It is further necessary to adjust the ink so as to have the properties of the dynamic surface tension as described above. As the permeating agents for imparting such properties of the dynamic surface tension as described above to the ink, there may be used the following permeating agents. It goes without saying that the present invention is not limited thereto.

[Surfactant]

As nonionic surfactants, there may be used the following surfactants: polyoxyethylene alkyl ethers, polyoxyethylene fatty acid esters, polyoxyethylene alkyl phenyl ethers, fatty acid diethanolamides, polyoxyethylene-polyoxypropylene block copolymers, acetylene glycol surfactants, and the like.

As anionic surfactants, there may be used the following surfactants: polyoxyethylene alkyl ether sulfate salts, polyoxyethylene alkyl ether sulfonate, polyoxyethylene alkyl phenyl ether sulfate salts, polyoxyethylene alkyl phenyl ether sulfonates, alpha-sulfo-fatty acid ester salts, alkylbenzene sulfonates, alkyl phenolsulfonic acid salts, alkyl naphthalenesulfonic acid salts, alkyl tetralinsulfonic acid salts, dialkyl sulfosuccinic acid salts, and the like.

As amphoteric surfactants, there may be used the following surfactants: cationic surfactants such as alkyltrimethylammonium salts and dialkyldimethylammonium chlorides, alkylcarboxybetaine, and the like.

Among the above-mentioned surfactants, polyoxyethylene alkyl ethers are particularly preferably used. Polyoxyethylene alkyl ethers containing an alkyl group having 12 to 18 carbon atoms are more preferred, and those whose alkyl group is a lauryl group, cetyl group or oleyl group are particularly preferred.

In the present invention, the HLB value of the surfactant as determined by the Griffin method is preferably from 8.0 or more to 15.5 or less, more preferably from 9.0 or more to 14.0 or less, particularly preferably from 9.0 or more to 13.6 or less. If the HLB value is less than 8.0, the solubility of such a surfactant in water is low, and so the surfactant is hard to be dissolved in water and the surfactant may be unevenly distributed on the surface of an ink droplet in some cases. If the HLB value of the surfactant is more than 15.5 on the other hand, the change of the dynamic surface tension of the ink becomes small, and so the effect of the present invention may not be sufficiently achieved in some cases.

The content (mass %) of the surfactant in the ink is preferably from 0.10 mass % or more to 0.75 mass % or less based on the total mass of the ink. If the content is less than 0.10 mass %, it may be difficult in some cases to lower the dynamic surface tension of the ink at the 5,000 milliseconds. If the content is more than 0.75 mass % on the other hand, it may be difficult in some cases to raise the dynamic surface tension of the ink at the 50 milliseconds. Further, if the content is too much, the surfactant excessively present in the ink acts on a pigment in some cases when the pigment is used as a coloring. As a result, this influences the dispersion properties or aggregation properties of the pigment, so a change in state of the ink (viscosity increase of the ink, association or aggregation of a coloring material) due to evaporation or the like may occur in some cases.

[Water-soluble Organic Solvent]

No particular limitation is imposed on the water-soluble organic solvent so far as the ink is adjusted so as to have the properties of the dynamic surface tension as described above. The content (mass %) of the water-soluble organic solvent in the ink is preferably from 3.0 mass % or more to 50.0 mass % or less based on the total mass of the ink. As the water-soluble organic solvent, may be specifically used the following solvent:

Alcohols having 1 to 6 carbon atoms, such as ethanol, isopropanol, 2-propanol, n-butanol, isobutanol, butanol, pentanol and hexanol; carboxylic acid amides such as N,N-dimethylformamide and N,N-dimethylacetamide; ketones such as acetone, methyl ethyl ketone and 2-methyl-2-hydroxypentan-4-on; cyclic ethers such as keto-alcohol, tetrahydrofuran and dioxane; polyhydric alcohol such as glycerol, ethylene glycol, diethylene glycol, triethylene glycol, tetraethylene glycol, 1,2- or 1,3-propylene glycol, 1,2- or 1,4-butylene glycol and polyethylene glycol; polyhydric alcohols such as 1,3-butanediol, 1,2- or 1,5-pentanediol, 1,2- or 1,6-hexanediol, dithioglycol, 2-methyl-1,3-propanediol, 1,2,6-hexanetriol and trimethylolpropane; alkyl ethers of polyhydric alcohols, such as ethylene glycol monomethyl (or ethyl) ether, diethylene glycol monomethyl (or ethyl) ether and triethylene glycol monoethyl (or butyl) ether; heterocyclic compounds such as 2-pyrrolidone, N-methyl-2-pyrrolidone, 1,3-dimethyl-2-imidazolidinone and N-methylmorpholine; and sulfur-containing compounds such as dimethyl sulfoxide.

Among the above-described solvents, glycerol, ethylene glycol, 2-pyrrolidone and the like are particularly preferably used. Alcohols such as ethanol, 2-propanol, 1,2-pentanediol and 1,2-hexanediol, and alkylene glycols, which are water-soluble organic solvents having high permeability, are preferably used.

(Water)

The ink according to the present invention preferably has a proper viscosity for stably ejecting the ink and contains water for holding the ink an ink with inhibited clogging at orifices. As water, there may preferably be used deionized water (ion-exchanged water). The content (mass %) of water in the ink is preferably from 30.0 mass % or more to 90.0 mass % or less based on the total mass of the ink.

(Coloring Material)

No particular limitation is imposed on coloring materials usable in the inks according to the present invention so far as they are coloring materials usable in aqueous inks. For example, water-soluble dyes or pigments may be used. The content (mass %) of the coloring material in the ink is preferably from 0.1 mass % or more to 15.0 mass % or less. More preferably the content is from 1.0 mass % or more to 10.0 mass % or less based on the total mass of the ink.

[Pigment]

Pigments usable in the inks according to the present invention include carbon black and organic pigments. As the pigment, any pigment may be used irrespective of the dispersing system thereof. For example, a resin dispersion type pigment (resin dispersion pigment) using a dispersant, or a surfactant dispersion type pigment may be used. A pigment which is made dispersible without using a dispersant or the like by enhancing the dispersibility of the pigment itself, may also be used. For example, a microcapsule type pigment, a self-dispersion type pigment (self-dispersion pigment) to the surfaces of particles of which a hydrophilic group is introduced, or a pigment, to the surfaces of particles of which a polymer-containing organic group is chemically bonded (polymer-bonded type self-dispersion pigment), may be used. It goes without saying that these pigments different from one another in dispersing system may also be used in combination.

A pigment is preferably used in the ink according to the present invention because the change in state of the ink (viscosity increase of the ink, association or aggregation of a coloring material) easily occurs by evaporation or the like of the ink after the ink is applied to a recording medium. The resin dispersion pigment may be hard in some cases to cause a change of dynamic surface tension in the ink because the surfactant or the like is easy to be adsorbed on the resin. Therefore, self-dispersion pigments including the above-described self-dispersion pigment and polymer-bonded type self-dispersion pigment are preferably used.

[Self-dispersion Pigment]

As the self-dispersion pigment, there is preferably used a pigment to the surfaces of particles of which a hydrophilic group is chemically bonded directly or through another atomic group. It is preferable that the hydrophilic group be selected from the group consisting of —COOM, —SO$_3$M and —PO$_3$HM (M is a hydrogen atom, alkali metal, ammonium or organic ammonium). It is also preferable that said another atomic group be an alkylene group having 1 to 12 carbon atoms, a substituted or unsubstituted phenylene group or a substituted or unsubstituted naphthylene group.

Besides, a surface-oxidation treatment type self-dispersion pigment obtained by, for example, a method, in which a pigment is subjected to an oxidation treatment with sodium hypochlorite, a method in which a pigment is oxidized by an underwater ozone treatment or a method in which a pigment is subjected to an ozone treatment and then wet-oxidized with an oxidizing agent to modify the surface of pigment particles may also be used.

[Polymer-bonded Type Self-dispersion Pigment]

In the present invention, a polymer-bonded type self-dispersion pigment which is made dispersible without using a dispersant or the like by enhancing the dispersibility of the pigment itself, may be used. This polymer-bonded type self-dispersion pigment preferably contains a reaction product of a functional group which is chemically bonded to the surfaces of the pigment particles directly or through another atomic group with a copolymer of an ionic monomer and a hydrophobic monomer. The pigment having such a structure is preferred because the hydrophilicity of the pigment can be controlled, since the copolymerization ratio between the ionic monomer and the hydrophobic monomer making up the copolymer used in the modification of the surfaces of the pigment particles can be suitably changed. In addition, since the kinds of the ionic monomer and the hydrophobic monomer and combinations of these monomers can be selected, various properties can be imparted to the surfaces of the pigment particles, and so this pigment is preferred even from this point of view.

[Resin Dispersion Pigment]

The resin dispersion pigment preferably uses a dispersant capable of dispersing the pigment by an action of an anionic group. The weight average molecular weight of the dispersant is preferably from 1,000 or more 30,000 or less, more preferably from 3,000 or more to 15,000 or less. As the dispersant, there may be specifically used the following dispersants:

Styrene-acrylic acid copolymers, styrene-acrylic acid-alkyl acrylate terpolymers, styrene-maleic acid copolymers, styrene-maleic acid-alkyl acrylate terpolymers, styrene-methacrylic acid copolymers, styrene-methacrylic acid-alkyl acrylate terpolymers, styrene-maleic acid half ester copolymers, vinylnaphthalene-acrylic acid copolymers, vinylnaphthalene-maleic acid copolymers, styrene-maleic anhydride-maleic acid half ester terpolymers, benzyl methacrylate-methacrylic acid copolymers, and salts of these co- or terpolymers.

[Carbon Black]

A pigment used in a black ink is preferably carbon black. Examples of usable carbon black include furnace black, lamp black, acetylene black and channel black. As the carbon black, there may be specifically used the following carbon black:

Raven: 1170, 1190 ULTRA-II, 1200, 1255, 1250, 1500, 2000, 3500, 5000, 5250, 5750 and 7000 (all, products of Columbian Carbon Co.); Black Pearls L, Regal: 300R, 400R and 660R, Mogul L, Monarch: 700, 800, 880, 900, 1000, 1100, 1300 and 1400, and Valcan XC-72R (all, products of CABOT CO.); Color Black: FW1, FW2, FW2V, FW18, FW200, S150, S160 and S170, Printex: 35, U, V, 140U and 140V, and Special Black: 4, 4A, 5 and 6 (all, products of Degussa AG); and No. 25, No. 33, No. 40, No. 47, No. 52, No. 900, No. 2300, MCF-88, MA7, MA8, MA100 and MA600 (all, products of MITSUBISHI CHEMICAL CORPORATION). Besides the above pigments, magnetic fine particles such as magnetite and ferrite, titanium black, and the like may also be used.

[Organic Pigment]

Pigments used in color inks are preferably organic pigments. As the organic pigments, there may be suitably used the following pigments:

Insoluble azo pigments such as Toluidine Red, Toluidine Maroon, Hansa Yellow, Benzidine Yellow and Pyrazolone Red; water-soluble azo pigments such as Lithol Red, Helio Bordeaux, Pigment Scarlet and Permanent Red 2B; derivatives from vat dyes, such as alizarin, indanthron and Thioindigo Maroon; phthalocyanine pigments such as Phthalocyanine Blue and Phthalocyanine Green; quinacridone pigments such as Quinacridone Red and Quinacridone Magenta; perylene pigments such as Perylene Red and Perylene Scarlet; isoindolinone pigments such as Isoindolinone Yellow and Isoindolinone Orange; imidazolone pigments such as Benzimidazolone Yellow, Benzimidazolone Orange and Benzimidazolone Red; pyranthrone pigments such as Pyranthrone Red and Pyranthrone Orange; indigo pigments; condensed azo pigments; thioindigo pigments; Flavanthrone Yellow; Acylamide Yellow; Quinophthalone Yellow; Nickel Azo Yellow; Copper Azomethine Yellow; Perinone Orange; Anthrone Orange; Dianthraquinonyl Red; Dioxazine Violet; etc.

When organic pigments are indicated by COLOR INDEX (C.I.) numbers, the following pigments may be specifically used:

C.I. Pigment Yellow: 12, 13, 14, 17, 20, 24, 74, 83, 86, 93, 109, 110, 117, 120, 125, 128, 137, 138, 147, 148, 151, 153, 154, 166 and 168; C.I. Pigment Orange: 16, 36, 43, 51, 55, 59 and 61; C.I. Pigment Red: 9, 48, 49, 52, 53, 57, 97, 122, 123, 149, 168, 175, 176, 177, 180, 192, 215, 216, 217, 220, 223, 224, 226, 227, 228, 238 and 240; C.I. Pigment Violet: 19, 23, 29, 30, 37, 40 and 50; C.I. Pigment Blue: 15, 15:3, 15:1, 15:4, 15:6, 22, 60 and 64; C.I. Pigment Green: 7 and 36; and C.I. Pigment Brown 23, 25 and 26.

[Dye]

Dyes usable in the inks according to the present invention include direct dyes, acid dyes, reactive dyes, basic dyes, and the like. Even dyes which are not described in COLOR INDEX may be used so far as they are soluble in water. When dyes are indicated by COLOR INDEX (C.I.) numbers, the following dyes may be specifically used:

[Yellow Dye]

C.I. Direct Yellow: 8, 11, 12, 27, 28, 33, 39, 44, 50, 58, 85, 86, 87, 88, 89, 98, 100, 110 and 132; C.I. Acid Yellow: 1, 3, 7, 11, 17, 23, 25, 29, 36, 38, 40, 42, 44, 76, 98 and 99; C.I. Reactive Yellow: 2, 3, 17, 25, 37 and 4; and C.I. Food Yellow 3.

[Magenta Dye]

C.I. Direct Red: 2, 4, 9, 11, 20, 23, 24, 31, 39, 46, 62, 75, 79, 80, 83, 89, 95, 197, 201, 218, 220, 224, 225, 226, 227, 228, 229 and 230; C.I. Acid Red: 6, 8, 9, 13, 14, 18, 26, 27, 32, 35, 42, 51, 52, 80, 83, 87, 89, 92, 106, 114, 115, 133, 134, 145, 158, 198, 249, 265 and 289; C.I. Food Red: 87, 92 and 94; and C.I. Direct Violet 107.

[Cyan Dye]

C.I. Direct Blue: 1, 15, 22, 25, 41, 76, 77, 80, 86, 90, 98, 106, 108, 120, 158, 163, 168, 199, 226 and 307; and C.I. Acid Blue: 1, 7, 9, 15, 22, 23, 25, 29, 40, 43, 59, 62, 74, 78, 80, 90, 100, 102, 104, 112, 117, 127, 138, 158, 161, 203, 204, 221 and 244.

[Black Dye]

C.I. Direct Black: 17, 19, 22, 31, 32, 51, 62, 71, 74, 112, 113, 154, 168 and 195; C.I. Acid Black: 2, 48, 51, 52, 110, 115 and 156; and C.I. Food Black 1: and 2.

(Other Additives)

Besides the above components, various additives, such as nitrogen-containing compounds such as urea and ethyleneurea, pH adjustors, rust preventives, preservatives, mildewproofing agents, antioxidants, anti-reducing agents and chelating agents may be contained in the inks according to the present invention.

<Ink Jet Recording Method, Ink Cartridge, Recording Unit and Ink Jet Recording Apparatus>

Figure 2:
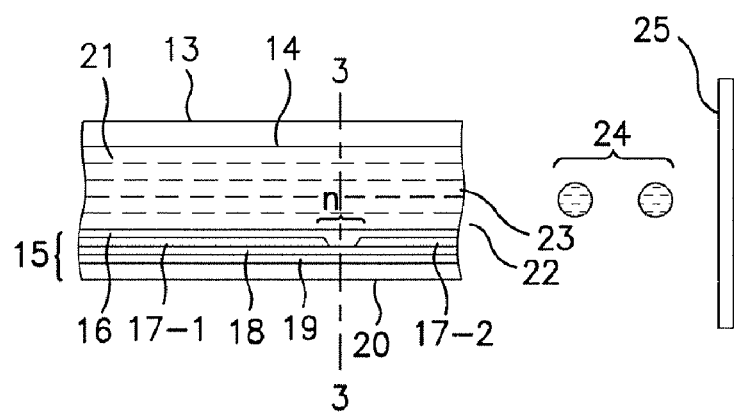
FIG. 2 is a longitudinal cross-sectional view illustrating a recording head.
Figure 3:
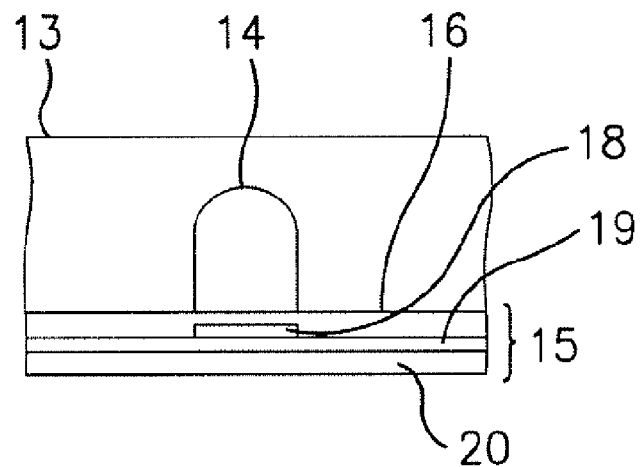
FIG. 3 is a transverse cross-sectional view of the recording head.

An exemplary ink jet recording apparatus will hereinafter be described. First of all, an exemplary construction of a recording head which is a main component of the ink jet recording apparatus making good use of thermal energy is shown in FIG. 2 and FIG. 3. FIG. 2 is a cross-sectional view of a recording head 13 taken along the flow path of ink, and FIG. 3 is a cross-sectional view taken along line 3-3 in FIG. 2. The recording head 13 is obtained by bonding a glass, ceramic, silicon, plastic plate or the like having a flow path (nozzle) 14, through which an ink is caused to pass, to a heating element substrate 15.

The heating element substrate 15 is composed of a protective layer 16, electrodes 17-1 and 17-2, a heating resistor layer 18, a heat accumulating layer 19 and a substrate 20. The protective layer 16 is formed with silicon oxide, silicon nitride, silicon carbide or the like. The electrodes 17-1 and 17-2 are formed with aluminum, gold, aluminum-copper alloy or the like. The heating resistor layer 18 is formed with a high-melting material such as $HfB_2$, TaN or TaAl. The heat accumulating layer 19 is formed with thermally oxidized silicon, aluminum oxide or the like. The substrate 20 is formed with a material having good heat radiating property, such as silicon, aluminum or aluminum nitride.

When pulsed electric signals are applied to the electrodes 17-1 and 17-2 of the recording head 13, the heating element substrate 15 rapidly generates heat at the region shown by 'n' to generate bubbles in an ink 21, which is in contact with this surface. A meniscus 23 is projected by the pressure of the bubbles, and the ink 21 is ejected through the nozzle 14 of the recording head to fly out of an ejection orifice 22 toward a recording medium 25 in the form of ink droplets 24.

Figure 4:
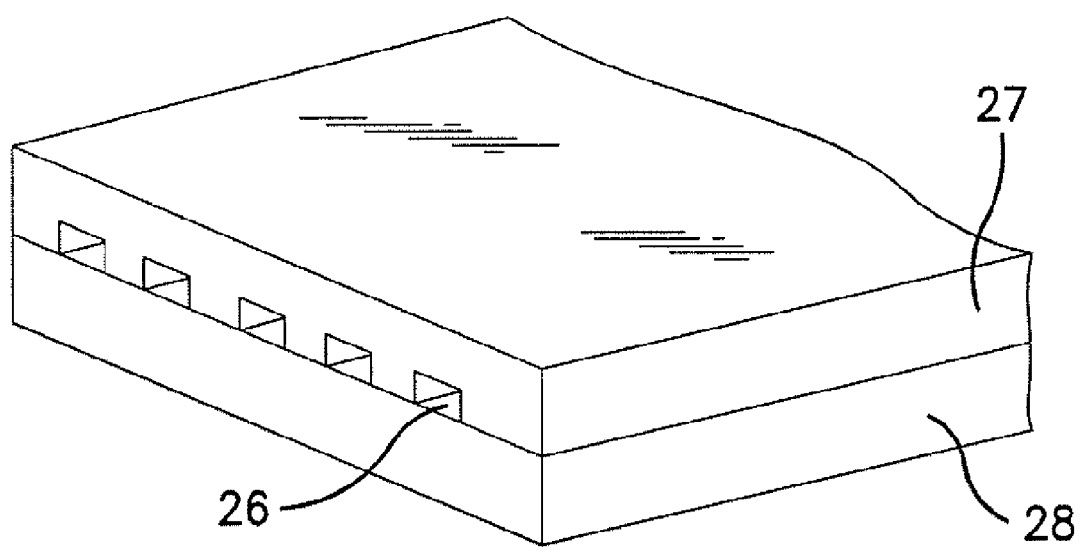
FIG. 4 is a perspective view illustrating the appearance of a multi-head composed of an array of a number of recording heads as shown in FIG. 2.

FIG. 4 illustrates an appearance of a multi-head composed of an array of a number of heads as shown in FIG. 2. The multi-head is formed by bonding a glass plate 27 having a number of nozzles 26 to a heating head 28 similar to that described in FIG. 1.

Figure 5:
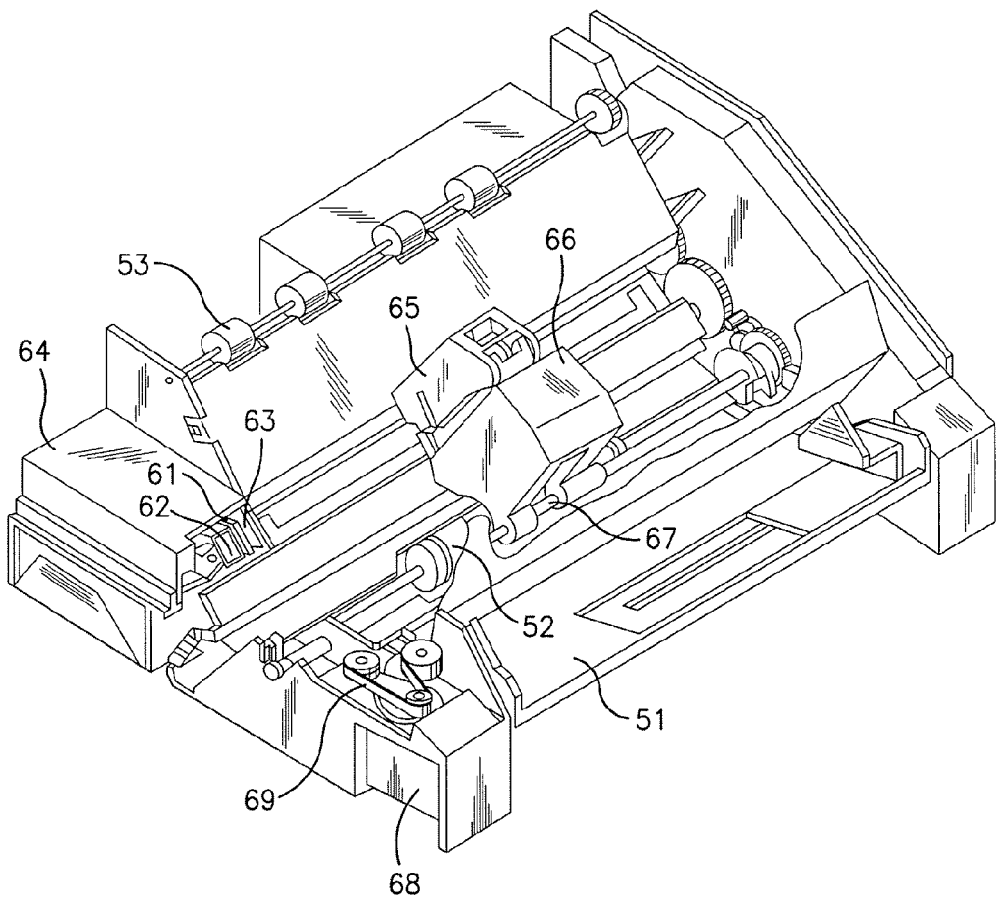
FIG. 5 is a perspective view illustrating an exemplary ink jet recording apparatus.

FIG. 5 illustrates an example of an ink jet recording apparatus in which this recording head has been incorporated. In FIG. 5, one end of a blade 61 that is a wiping member is held and fixed by a blade-holding member to form a cantilever. The blade 61 is arranged at a position adjacent to a recording region, in which a recording head 65 operates, and in the illustrated embodiment, is held in a form protruding into the course through which the recording head 65 is moved. Reference numeral 62 indicates a cap for the face of ejection openings of the recording head 65, which is provided at a home position adjacent to the blade 61, and is so constructed that it moves in a direction perpendicular to a direction in which the recording head 65 is moved, and comes into contact with the face of the ejection openings to cap it. Reference numeral 63 denotes an ink absorbing member provided adjoiningly to the blade 61 and, similarly to the blade 61, is held in a form protruding into the course through which the recording head 65 is moved. An ejection-recovery portion 64 is constructed by the blade 61, cap 62 and ink absorbing member 63. Water, dust and/or the like are removed from the face of the ink-ejecting openings by the blade 61 and ink absorbing member 63. Reference numeral 65 designates the recording head having an ejection-energy-generating means and serving to eject the ink on a recording medium set in an opposing relation to the ejection opening face provided with the ejection openings to conduct recording. Reference numeral 66 indicates a carriage on which the recording head 65 is mounted so that the recording head 65 can be moved. The carriage 66 is slidably interlocked with a guide shaft 67 and is connected (not illustrated) at its part to a belt 69 driven by a motor 68. Thus, the carriage 66 can be moved along the guide shaft 67 and hence, the recording head 65 can be moved from a recording region to a region adjacent thereto. Reference numerals 51 and 52 denote a feeding part from which the recording medium is inserted, and feed rollers driven by a motor (not illustrated), respectively. With such a construction, the recording medium is fed to the position opposite to the ejection opening face of the recording head 65, and discharged from a discharge section provided with discharge rollers 53 with the progress of recording. In the above construction, the cap 62 in the ejection-recovery portion 64 is receded from the path of motion of the recording head 65 when the recording head 65 is returned to its home position after completion of recording, and the blade 61 remains protruded into the path of motion. As a result, the ejection opening face of the recording head 65 is wiped. Incidentally, when the cap 62 comes into contact with the ejection opening face of the recording head 65 to cap it, the cap 62 is moved so as to protrude into the path of motion of the recording head 65. When the recording head 65 is moved from its home position to the position at which recording is started, the cap 62 and blade 61 are at the same positions as the positions for the wiping as described above. As a result, the ejection opening face of the recording head 65 is also wiped at the time of this movement. The above movement of the recording head 65 to its home position is made not only when the recording is completed or the recording head 65 is recovered for ejection, but also when the recording head 65 is moved in recording regions for the purpose of recording, it is moved to the home position adjacent to each recording region at given intervals, whereby the ejection opening face is wiped in accordance with this movement.

Figure 6:
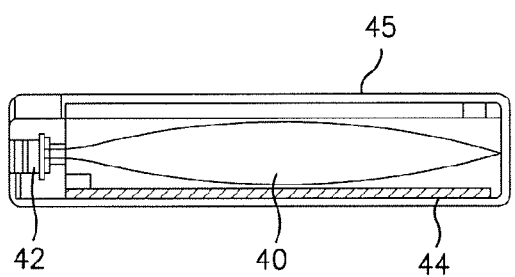
FIG. 6 is a longitudinal cross-sectional view illustrating an ink cartridge.

FIG. 6 illustrates an exemplary ink cartridge in which an ink to be fed to a recording head through a tube has been stored. Here, reference numeral 40 designates an ink storage portion storing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the recording head. Reference numeral 44 indicates an ink absorbing member for receiving a waste ink.

Figure 7:
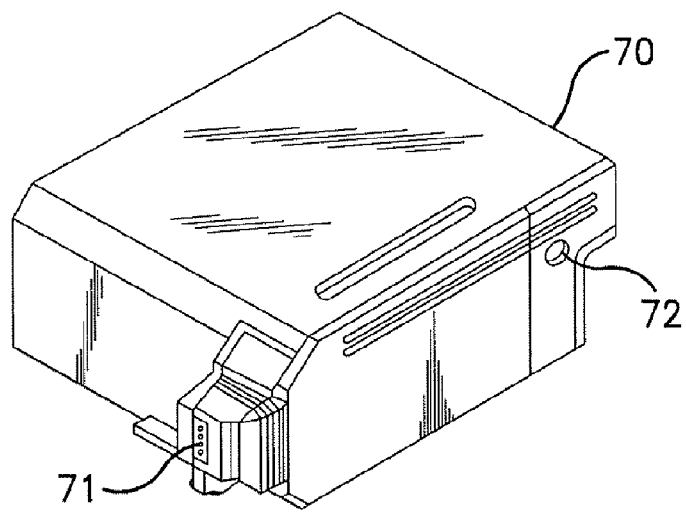
FIG. 7 is a perspective view illustrating an exemplary recording unit.

The ink jet recording apparatus is not limited to the apparatus in which the recording head and the ink cartridge are separately provided as described above. Therefore, an apparatus, in which the recording head and the ink cartridge are integrally formed as shown in FIG. 7, may also be preferably used. In FIG. 7, an ink storage portion storing an ink, for example, an ink absorbing member, is housed in a recording unit 70. The recording unit 70 is so constructed that the ink in such an ink-absorbing member is ejected in the form of ink droplets through a recording head portion 71 having a plurality of ejection openings. The ink storage portion may also be constructed by a bag for the ink, in the interior of which a spring or the like is provided, without using the ink absorbing member. Reference numeral 72 indicates an air passage for communicating the interior of the cartridge with the atmosphere. This recording unit 70 is used in place of the recording head 65 shown in FIG. 5, and is detachably installed on the carriage 66.

Figure 8:
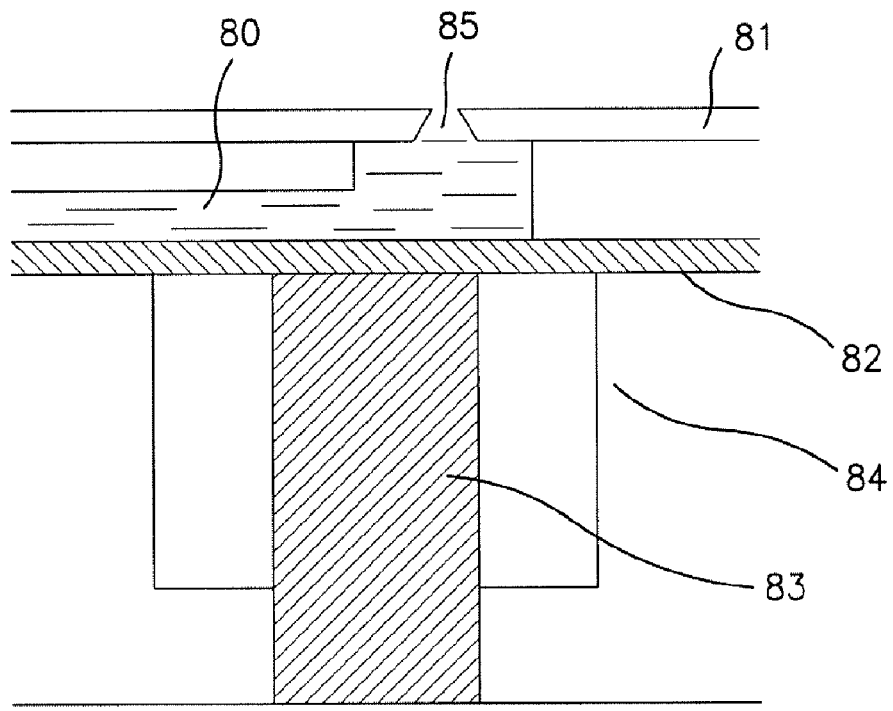
FIG. 8 illustrates the construction of an exemplary recording head.

As a preferable example of an ink jet recording apparatus making good use of mechanical energy, there may be mentioned that having an On-Demand type ink jet recording head of the following construction. Specifically, the ink jet recording apparatus has a nozzle-formed substrate having a plurality of nozzles and pressure-generating devices composed of a piezoelectric material and an electric conductive material and provided in an opposing relation to the nozzles. The apparatus is provided with an ink filled around the pressure-generating devices and ejects ink droplets from the nozzles by displacing the pressure-generating devices by application of a voltage. FIG. 8 illustrates an example of the construction of a recording head, which is a principal part of the above-described ink jet recording apparatus. The recording head is constructed by an ink flow path 80, an orifice plate 81, a vibration plate 82, a piezoelectric element 83, and a substrate 84 for supporting and fixing the orifice plate 81, the vibration plate 82 and the like thereon. An ink is ejected as ink droplets having a desired volume through the orifice plate 81 from the ink flow path 80 communicating with an ink chamber (not illustrated). At this time, the ink is ejected by the action of the piezoelectric element 83 bonded to the vibration plate 82 to be displaced by an electric signal. The ink flow path 80 is formed with a photosensitive resin or the like. For the orifice plate 81, a metal such as stainless steel or nickel is subjected to hole-making through electroforming or press-working or the like to form the ejection opening 85. The vibration plate 82 is formed with a film of a metal such as stainless steel, nickel or titanium and a high-modulus resin film or the like. The piezoelectric element 83 is made of a dielectric material such as barium titanate or PZT. The recording head with such construction as described above generates strain stress by applying a pulsed voltage to the piezoelectric element 83. The vibration plate bonded to the piezoelectric element 83 is deformed by the energy of the stress, and the ink in the ink flow path 80 is thus perpendicularly pressurized to eject ink droplets (not illustrated) from the ejection opening 85 of the orifice plate 81, thereby conducting recording. Such a recording head can be used by incorporating it into an ink jet recording apparatus similar to that illustrated in FIG. 5. Operation of details of the ink jet recording apparatus may be conducted in the same manner as described above.

[Examples]

The present invention will hereinafter be described more specifically by the following Examples and Comparative Examples. However, the present invention is not limited by these examples unless going beyond the gist of the present invention. Incidentally, all designations of "part(s)" and "%" as will be used in the following examples mean part(s) by mass and mass % unless expressly noted.

<Preparation of Pigment Dispersion Liquid A>

To a solution with 2.5 g of concentrated hydrochloric acid dissolved in 5.5 g of water, was added 0.8 g of p-aminobenzoic acid in a state cooled to 5° C. A container in which this solution was contained was then placed in an ice bath, and the solution was stirred, whereby the solution always remained in a state kept to 10° C. or less, to which a solution with 0.9 g of sodium nitrite dissolved in 9 g of water of 5° C. was added. After this solution was stirred for additional 15 minutes, 9 g of carbon black having a specific surface area of 220 $m^2/g$ and a DBP oil absorption of 105 mL/100 g was added with stirring. Thereafter, the resultant mixture was stirred for additional 15 minutes. After the resultant slurry was filtered through a filter paper (trade name: Standard Filter Paper No. 2; product of Advantec Co.), the resultant particles were fully washed with water and dried in an oven controlled to 110° C., thereby preparing self-dispersion carbon black A. Water was further added to the self-dispersion carbon black A obtained above to disperse the carbon black so as to give a pigment concentration of 10 mass %, thereby preparing a dispersion liquid. A pigment dispersion liquid A in a state where the self-dispersion carbon black A (pigment A), to the surfaces of particles of which —$C_6H_4$—COONa group had been introduced was dispersed in water was obtained in accordance with the above-described process.

Incidentally, the density of the ionic group in the self-dispersion carbon black A prepared above was measured. As a result, it was 1.0 $\mu mol/m^2$. The measuring method for the density of the ionic group used at this time was such that the sodium ion concentration in the pigment dispersion liquid prepared above was measured by means of an ion meter (manufactured by DKK) to convert this value into the density of the ionic group in the self-dispersion carbon black.

(Preparation of Pigment Dispersion Liquid B)

To a solution with 5 g of concentrated hydrochloric acid dissolved in 5.5 g of water, was added 1.55 g of p-aminobenzoic acid in a state cooled to 5° C. A container in which this solution was contained was then placed in an ice bath, and the solution was stirred, whereby the solution always remained in a state kept to 10° C. or less, to which a solution with 1.8 g of sodium nitrite dissolved in 9 g of water of 5° C. was added. After this solution was stirred for additional 15 minutes, 6 g of carbon black having a specific surface area of 220 $m^2/g$ and a DBP oil absorption of 105 mL/100 g was added with stirring. Thereafter, the resultant mixture was stirred for additional 15 minutes. After the resultant slurry was filtered through a filter paper (trade name: Standard Filter Paper No. 2; product of Advantec Co.), the resultant particles were fully washed with water and dried in an oven controlled to 110° C., thereby preparing self-dispersion carbon black B. Water was further added to the self-dispersion carbon black B obtained above to disperse the carbon black so as to give a pigment concentration of 10 mass %, thereby preparing a dispersion liquid. A pigment dispersion liquid B in a state where the self-dispersion carbon black B (pigment B), to the surfaces of particles of which —$C_6H_4$—COONa group had been introduced was dispersed in water was obtained in accordance with the above-described process.

Incidentally, the density of the ionic group in the self-dispersion carbon black B prepared above was measured in accordance with the same method as in the self-dispersion carbon black A. As a result, it was 2.6 $\mu mol/m^2$.

(Preparation of Pigment Dispersion Liquid C)

A reactor was charged with 500 g of carbon black having a specific surface area of 220 $m^2/g$ and a DBP oil absorption of 112 ml/100 g, 45 g of aminophenyl (2-sulfoethyl) sulfone and 900 g of distilled water, and the resultant mixture was stirred for 20 minutes at 55° C. and a rotating speed of 300 RPM. Thereafter, 40 g of 25 mass % sodium nitrite was added dropwise for 15 minutes, and 50 g of distilled water was additionally added. Thereafter, a reaction was conducted for 2 hours at 60° C. The resultant reaction product was taken out while being diluted with distilled water to adjust the reaction product so as to give a solid content concentration of 15 mass %. Further, a centrifugal treatment and a purification treatment were conducted to remove impurities, thereby obtaining a dispersion liquid (1). The carbon black in the dispersion liquid (1) was in a state where a functional group of an aminophenyl (2-sulfoethyl) sulfone had been introduced into the surface thereof.

The molar number of the functional group bonded to the carbon black in this dispersion liquid (1) was determined. The sodium ion in the dispersion liquid (1) was measured by means of a probe type sodium electrode, and the resultant value was converted into a value per unit weight of the carbon black powder to find the molar number of the functional group bonded to the carbon black. The dispersion liquid (1) was then added dropwise to a pentaethylenehexamine solution. At this time, the pentaethylenehexamine solution was kept at room temperature while strongly stirring it, and the dispersion liquid (1) was added dropwise over 1 hour. At this time, the concentration of pentaethylenehexamine was set 1 to 10 times as much as the molar number of the sodium ion previously measured, and the amount of the solution was set equal to the dispersion liquid (1). After this mixture was additionally stirred for 18 to 48 hours, a purification treatment was conducted to remove impurities, thereby obtaining a dispersion liquid (2) having a solid content concentration of 10 mass %. The carbon black in the dispersion liquid (2) was in a state where pentaethylenehexamine was bonded to the surface thereof.

A styrene-acrylic acid polymer was prepared. First, 190 g of a styrene-acrylic acid polymer having a weight average molecular weight of 8,000, an acid value of 140 and a polydispersity Mw/Mn (weight average molecular weight Mw, number average molecular weight Mn) of 1.5 was weighed. To this polymer, was added 1,800 g of distilled water followed by addition of sodium hydroxide in an amount sufficient to neutralize the polymer, and then the resultant mixture was stirred to dissolve the polymer, thereby preparing an aqueous solution of the styrene-acrylic acid polymer.

Then, 500 g of the dispersion liquid (2) was added to the aqueous solution of the styrene-acrylic acid polymer obtained above with stirring. The mixture of the dispersion liquid (2) and the aqueous solution of the styrene-acrylic acid was transferred to an evaporation dish and heated for 15 minutes at 150° C. to evaporate the mixture, and the dried product was then cooled to room temperature.

The dried product obtained above was then added to distilled water, the pH of which was adjusted to 9.0 with sodium hydroxide, and dispersed by means of a dispersing machine, and then a 1.0N aqueous solution of sodium hydroxide was additionally added thereto with stirring to adjust the pH of the liquid to 10 to 11. Thereafter, desalting and a purification treatment were conducted to remove impurities and coarse particles. A pigment dispersion liquid C in a state where the polymer-bonded type self-dispersion carbon black was dispersed in water was obtained in accordance with the above-described process.

Incidentally, the solid content concentration and pH of the pigment dispersion liquid C prepared above were 10 mass % and 10.1, respectively, and the average particle size of the pigment was 130 nm.

(Preparation of pigment dispersion liquid D)

Ten parts of carbon black having a specific surface area of 210 m²/g and a DBP oil absorption of 74 ml/100 g, 20 parts of a polymer obtained by neutralizing a styrene-acrylic acid copolymer having an acid value of 200 and a weight average molecular weight of 10,000 with a 10 mass % aqueous solution of sodium hydroxide, and 70 parts of water were mixed. This mixture was subjected to a dispersion treatment for 1 hour by means of a sand grinder and then to a centrifugal treatment to remove coarse particles, and the thus treated mixture was filtered under pressure through a microfilter (product of Fuji Photo Film Co., Ltd.) having a pore size of 3.0 μm. A pigment dispersion liquid D in a state where the resin dispersion carbon black was dispersed in water was obtained in accordance with the above-described process.

Incidentally, the solid content concentration and pH of the pigment dispersion liquid D prepared above were 10 mass % and 10.0, respectively, and the average particle size of the pigment was 120 nm.

<HLB Value of Surfactant>

The HLB values of surfactants were determined. Specifically, the HLB values of main components in the respective surfactants were calculated by means of the Griffin method and the Davis method. The results are shown in Table 1.

Here, the Griffin method and the Davis method are described. The HLB value according to the Griffin method is found in accordance with the following equation (1) on the basis of the formula weight of a hydrophilic group of a surfactant and the molecular weight of the surfactant. On the other hand, the HLB value according to the Davis method is found in accordance with the following equation (2) by determining the specific group number of a functional group of a surfactant.

HLB value by griffin Method =20×Formula weight of hydrophilic group/Formula weight Incidentally, in Table 1, EMULMIN CC-100, EMULMIN CC-150, EMULMIN CC-200, EMULMIN L90S, EMULMIN L380, EMULMIN NL80, EMULMIN CO-50 and EMULMIN CO-200 are all surfactants produced by Sanyo Chemical Industries, Co. Ltd., ACETYLENOL E-100 is a surfactant produced by Kawaken Fine Chemicals Co., Ltd., and NONIPOL 130 is a surfactant produced by Sanyo Chemical Industries, Co. Ltd.

In Table 1, the structures of main components of the respective surfactants, and the number of carbon atoms and the name of the alkyl group when the structure is of a polyoxyethylene alkyl ether are shown collectively.

TABLE 1

| | HLB value of surfactant | | | Number of carbon atoms |
|---|---|---|---|---|
| | Griffin method | Davis method | Structure of surfactant | of alkyl group |
| EMULMIN CC-100 | 12.9 | 4.6 | Polyoxyethylene cetyl ether | 16 (cetyl group) |
| EMULMIN CC-150 | 14.6 | 6.3 | Polyoxyethylene cetyl ether | 16 (cetyl group) |
| EMULMIN CC-200 | 15.7 | 7.9 | Polyoxyethylene cetyl ether | 16 (cetyl group) |
| EMULMIN L90S | 13.6 | 6.2 | Polyoxyethylene lauryl ether | 12 (lauryl group) |
| EMULMIN L380 | 18.0 | 15.7 | Polyoxyethylene lauryl ether | 12 (lauryl group) |
| EMULMIN NL80 | 13.1 | 5.8 | Polyoxyethylene lauryl ether | 12 (lauryl group) |
| EMULMIN CO-50 | 9.0 | 2.0 | Polyoxyethylene oleyl ether | 18 (oleyl group) |
| EMULMIN CO-200 | 15.3 | 7.0 | Polyoxyethylene oleyl ether | 18 (oleyl group) |
| ACETYLENOL E-100 | 13.0 | — | Acetylene glycol ethylene oxide adduct | — |

TABLE 1-continued

| | HLB value of surfactant | | | Number of carbon atoms of alkyl group |
|---|---|---|---|---|
| | Griffin method | Davis method | Structure of surfactant | |
| NONIPOL 130 | 14.4 | — | Polyoxyethylene nonyl phenyl ether | — |

<Preparation of Ink>
(Preparation of Pigment Ink)

After the components shown in Table 2 to Table 4 were mixed and sufficiently stirred, the resultant respective mixtures were filtered under pressure through a microfilter (product of Fuji Photo Film Co., Ltd.) having a pore size of 3.0 μm, thereby preparing pigment inks according to Examples 1 to 8 and Comparative Examples 1 to 14. Incidentally, in Table 2 to Table 4, EMULMIN CC-100, EMULMIN CC-150, EMULMIN CC-200, EMULMIN L90S, EMULMIN L380, EMULMIN NL80, EMULMIN CO-50 and EMULMIN CO-200 are all surfactants produced by Sanyo Chemical Industries, Co. Ltd., ACETYLENOL E-100 is a surfactant produced by Kawaken Fine Chemicals Co., Ltd., and NONIPOL 130 is a surfactant produced by Sanyo Chemical Industries, Co. Ltd.

TABLE 2

| | Example | | | | | | | |
|---|---|---|---|---|---|---|---|---|
| | 1 | 2 | 3 | 4 | 5 | 6 | 7 | 8 |
| Pigment dispersion liquid A | 50.00 | 50.00 | 50.00 | | | 50.00 | | |
| Pigment dispersion liquid B | | | | 50.00 | 50.00 | | | 50.00 |
| Pigment dispersion liquid C | | | | | | | 50.00 | |
| Pigment dispersion liquid D | | | | | | | | |
| Glycerol | 7.00 | 7.00 | 7.00 | 7.00 | 7.00 | 7.00 | 7.00 | 7.00 |
| Ethylene glycol | 5.00 | 5.00 | 5.00 | 5.00 | 5.00 | 5.00 | 5.00 | 5.00 |
| 2-Pyrrolidone | 5.00 | 5.00 | 5.00 | 5.00 | 5.00 | 3.00 | 5.00 | 7.00 |
| Polyethylene glycol (*1) | | | | | | | | |
| 1,2-Hexanediol | | | | | | | | |
| EMULMIN CC-100 | | | 0.75 | | | | 0.50 | |
| EMULMIN CC-150 | 0.50 | | | | | | | 0.75 |
| EMULMIN CC-200 | | | | | | | | |
| EMULMIN L90S | | | 0.30 | | | | | |
| EMULMIN L380 | | | | | | | | |
| EMULMIN NL80 | | | | 0.10 | | | | |
| EMULMIN CO-50 | | | | | 0.75 | | | |
| EMULMIN CO-200 | | | | | | 0.75 | | |
| ACETYLENOL E-100 | | | | | | | | |
| NONIPOL 130 | | | | | | | | |
| Ion-exchanged water | 32.50 | 32.25 | 32.70 | 32.90 | 32.25 | 34.25 | 32.50 | 30.25 |

(*1): Average molecular weight 600

TABLE 3

| | Comparative Example | | | | | | |
|---|---|---|---|---|---|---|---|
| | 1 | 2 | 3 | 4 | 5 | 6 | 7 |
| Pigment dispersion liquid A | | | 50.00 | 50.00 | | 50.00 | 50.00 |
| Pigment dispersion liquid B | 50.00 | 50.00 | | | 50.00 | | |
| Pigment dispersion liquid C | | | | | | | |
| Pigment dispersion liquid D | | | | | | | |
| Glycerol | 7.00 | 7.00 | 7.00 | 7.00 | 7.00 | 7.00 | 7.00 |
| Ethylene glycol | 5.00 | 5.00 | 5.00 | 5.00 | 5.00 | 5.00 | 5.00 |
| 2-Pyrrolidone | 3.00 | 5.00 | 5.00 | 5.00 | 5.00 | 5.00 | 5.00 |
| Polyethylene glycol (*1) | | | | | | | |
| 1,2-Hexanediol | | | 0.30 | | | | |
| EMULMIN CC-100 | | | | | | | |
| EMULMIN CC-150 | | | | | | | |
| EMULMIN CC-200 | | | | | | | |
| EMULMIN L90S | | | | 1.00 | | | |
| EMULMIN L380 | | | | | | 0.20 | |
| EMULMIN NL80 | | 0.30 | | | | | |
| EMULMIN CO-50 | | | | | | | |
| EMULMIN CO-200 | 0.15 | | | | | | |
| ACETYLENOL E-100 | | | | | | 0.15 | 0.50 |
| NONIPOL 130 | | | | | | | |
| Ion-exchanged water | 34.85 | 32.70 | 32.70 | 32.00 | 32.85 | 32.80 | 32.50 |

(*1): Average molecular weight 600

TABLE 4

| | Comparative Example | | | | | | |
|---|---|---|---|---|---|---|---|
| | 8 | 9 | 10 | 11 | 12 | 13 | 14 |
| Pigment dispersion liquid A | 50.00 | 50.00 | 50.00 | | | | |
| Pigment dispersion liquid B | | | | | 50.00 | | 50.00 |

TABLE 4-continued

|  | Comparative Example | | | | | | |
|---|---|---|---|---|---|---|---|
|  | 8 | 9 | 10 | 11 | 12 | 13 | 14 |
| Pigment dispersion liquid C |  |  |  |  |  |  | 50.00 |
| Pigment dispersion liquid D |  |  |  | 50.00 |  |  |  |
| Glycerol | 7.00 | 7.00 | 7.00 | 7.00 | 7.00 | 7.00 | 7.00 |
| Ethylene glycol | 5.00 | 5.00 | 5.00 | 5.00 | 5.00 |  | 5.00 |
| 2-Pyrrolidone | 5.00 | 5.00 | 5.00 | 5.00 | 5.00 |  |  |
| Polyethylene glycol (*1) |  |  |  |  |  | 3.50 |  |
| 1,2-Hexanediol |  |  |  |  |  |  |  |
| EMULMIN CC-100 |  |  |  |  |  |  |  |
| EMULMIN CC-150 |  |  |  |  |  |  |  |
| EMULMIN CC-200 |  | 0.09 |  | 0.75 |  |  |  |
| EMULMIN L90S |  |  | 0.80 |  | 0.75 |  |  |
| EMULMIN L380 |  |  |  |  |  |  |  |
| EMULMIN NL80 |  |  |  |  |  |  |  |
| EMULMIN CO-50 |  |  |  |  |  |  |  |
| EMULMIN CO-200 |  |  |  |  |  |  |  |
| ACETYLENOL E-100 |  |  |  |  |  | 0.10 | 0.10 |
| NONIPOL 130 | 0.50 |  |  |  |  |  |  |
| Ion-exchanged water | 32.50 | 32.91 | 32.20 | 32.25 | 32.25 | 39.40 | 37.90 |

(*1): Average molecular weight 600

(Preparation of Dye Ink)

After the components shown in Table 5 were mixed and sufficiently stirred, the resultant respective mixtures were filtered under pressure through a microfilter (product of Fuji Photo Film Co., Ltd.) having a pore size of 0.2 µm, thereby preparing dye inks according to Examples 9 to 10 and Comparative Examples 15 to 20. Incidentally, in Table 5, EMULMIN CC-100, EMULMIN CC-150, EMULMIN CC-200, EMULMIN L90S, EMULMIN L380, EMULMIN NL80, EMULMIN CO-50 and EMULMIN CO-200 are all surfactants produced by Sanyo Chemical Industries, Ltd., ACETYLENOL E-100 is a surfactant produced by Kawaken Fine Chemicals Co., Ltd., and NONIPOL 130 is a surfactant produced by Sanyo Chemical Industries, Ltd.

<Evaluation>

(Measurement of Dynamic Surface Tension)

With respect to the respective inks of Examples 1 to 10 and Comparative Examples 1 to 20 obtained above, the dynamic surface tensions of the inks at (1) a lifetime of 50 milliseconds and (2) a lifetime of 5,000 milliseconds were measured by means of an apparatus (BP-D4; manufactured by Kyowa Interface Science Co., Ltd.) to conduct measurement in accordance with the maximum bubble pressure method. The difference $\Delta\gamma[(1)-(2)]$ between the dynamic surface tensions of (1) and (2) was also determined. The measurement of the dynamic surface tensions was conducted at 25° C. The evaluation results as to the dynamic surface tensions are shown in Table 6 and Table 7.

(Production of Recorded Article)

Each of the inks of Examples 1 to 10 and Comparative Examples 1 to 20 obtained above was charged into an ink cartridge, and the ink cartridge was installed in a modified ink jet recording apparatus "iP3100" (manufactured by Canon Inc.). Thereafter, a solid image of 1 cm×1 cm was recorded on the following recording media at a recording density of 100%. Incidentally, the ejection quantity per dot of the ink is within 24 ng ±10%. For the printer driver a default mode was selected.

Kind of paper: plain paper.
Print quality: standard.
Color adjustment: automatic.

As the recording media, were used the following 3 kinds of plain paper for copying.

PPC Paper Office Planner, product of Canon Inc.
PPC Paper 4025, product of Xerox Co.
PPC Paper Bright White, product of Hewlett-Packard Co.

[Image Density]

The image density (OD value) of each solid image of 1 cm×1 cm after ones day from the recording was measured by means of a reflection densitometer (trade name: Macbeth RD-918; manufactured by Macbeth Company). The evaluation standards of the image density when the pigment ink and

TABLE 5

|  | Example | | Comparative Example | | | | | |
|---|---|---|---|---|---|---|---|---|
|  | 9 | 10 | 15 | 16 | 17 | 18 | 19 | 20 |
| C.I. Direct Blue 199 | 6.00 | 6.00 | 6.00 | 6.00 | 6.00 | 6.00 | 6.00 | 5.00 |
| Glycerol | 10.00 | 10.00 | 10.00 | 10.00 | 10.00 | 10.00 | 10.00 | 10.00 |
| Diethylene glycol | 10.00 | 10.00 | 10.00 | 10.00 | 10.00 | 10.00 | 10.00 | 10.00 |
| 2-Pyrrolidone |  |  |  |  |  |  |  |  |
| Polyethylene glycol (*1) |  |  |  |  |  |  |  |  |
| 1,2-Pentanediol |  |  |  | 0.05 |  |  |  |  |
| EMULMIN CC-100 |  | 0.08 |  |  |  |  |  |  |
| EMULMIN CC-150 |  |  |  |  |  |  |  |  |
| EMULMIN CC-200 |  |  |  |  |  |  |  |  |
| EMULMIN L90S |  |  |  |  |  |  | 0.20 |  |
| EMULMIN L380 |  |  |  |  |  |  |  |  |
| EMULMIN NL80 |  |  |  |  |  |  |  |  |
| EMULMIN CO-50 |  |  |  |  |  |  |  |  |
| EMULMIN CO-200 | 0.10 |  |  |  |  |  |  |  |
| ACETYLENOL E-100 |  |  | 0.04 |  | 0.08 | 0.20 |  |  |
| NONIPOL 130 |  |  |  |  |  |  |  | 0.50 |
| Ion-exchanged water | 73.90 | 73.92 | 73.96 | 73.95 | 73.92 | 73.80 | 73.80 | 74.50 |

(*1): Average molecular weight 600 the dye ink are respectively used are as follows. The evaluation results are shown in Table 6 and Table 7.

Evaluation Standard of Pigment Ink

S: The average value of OD values for the 3 kinds of paper is 1.4 or more, the minimum value of OD values for the 3 kinds of paper is 1.3 or more, and the maximum value thereof is 1.5 or more;

A: The average value of OD values for the 3 kinds of paper is 1.4 or more, and the minimum value of OD values for the 3 kinds of paper is 1.3 or more;

B: The average value of OD values for the 3 kinds of paper is 1.4 or more, and the minimum value of OD values for the 3 kinds of paper is less than 1.3;

C: The average value of OD values for the 3 kinds of paper is less than 1.4, and the minimum value of OD values for the 3 kinds of paper is less than 1.3.

Evaluation Standard of Dye Ink

A: The average value of OD values for the 3 kinds of paper is 1.1 or more, and the minimum value of OD values for the 3 kinds of paper is 1.0 or more;

B: The average value of OD values for the 3 kinds of paper is 1.1 or more, and the minimum value of OD values for the 3 kinds of paper is less than 1.0;

C: The average value of OD values for the 3 kinds of paper is less than 1.1, and the minimum value of OD values for the 3 kinds of paper is less than 1.0.

[Fixing Ability]

Each solid image after 10 seconds from the recording was rubbed with Silbon paper, on which a weight of 40 g/cm$^2$ was placed to visually observe the degree of stain, thereby evaluating the sample as to the fixing ability. The evaluation standard of the fixing ability is as follows. The evaluation results are shown in Table 6 and Table 7.

S: No stain is observed on the 3 kinds of paper:
A: Stain is observed on one kind of paper;
B: Stain is observed on 2 or 3 kinds of paper;
C: Stain is observed on the 3 kinds of paper.

TABLE 6

| | | Dynamic surface tension [mN/m] | | | |
|---|---|---|---|---|---|
| | | (1) Life-time of 50 ms | (2) Life-time of 5000 ms | Δγ[(1) − (2)] | Image density | Fixing ability |
| Example | 1 | 59 | 38 | 21 | A | S |
| | 2 | 57 | 36 | 21 | A | S |
| | 3 | 58 | 33 | 25 | A | S |
| | 4 | 49 | 33 | 16 | S | S |
| | 5 | 54 | 36 | 18 | S | S |
| | 6 | 55 | 38 | 17 | A | S |
| | 7 | 58 | 36 | 22 | S | S |
| | 8 | 50 | 37 | 13 | S | A |
| Comp. Example | 1 | 57 | 41 | 16 | S | B |
| | 2 | 48 | 32 | 16 | A | S |
| | 3 | 55 | 55 | 0 | A | C |
| | 4 | 45 | 33 | 12 | B | S |
| | 5 | 43 | 38 | 5 | B | A |
| | 6 | 46 | 44 | 2 | B | B |
| | 7 | 36 | 32 | 4 | C | S |
| | 8 | 43 | 30 | 13 | C | S |
| | 9 | 71 | 71 | 0 | S | C |
| | 10 | 38 | 32 | 6 | C | S |
| | 11 | 49 | 42 | 7 | A | B |
| | 12 | 67 | 60 | 7 | B | C |
| | 13 | 45 | 40 | 5 | A | B |
| | 14 | 48 | 44 | 4 | B | B |

Incidentally, the minimum value of the OD values for the 3 kinds of paper in Comparative Example 2 was somewhat less than the minimum values for the OD values on the 3 kinds of paper in Examples 1 to 8. The dynamic surface tension at a lifetime of 10 milliseconds of Comparative Example 8 was 47 mN/m.

TABLE 7

| | | Dynamic surface tension [mN/m] | | | | |
|---|---|---|---|---|---|---|
| | | (1) Life-time of 50 ms | (2) Life-time of 5000 ms | Δγ[(1) − (2)] | Image density | Fixing ability |
| Example | 9 | 50 | 38 | 12 | A | S |
| | 10 | 51 | 35 | 16 | A | S |
| Comp. Example | 15 | 49 | 40 | 9 | A | B |
| | 16 | 53 | 53 | 0 | A | C |
| | 17 | 45 | 39 | 6 | B | B |
| | 18 | 35 | 32 | 3 | C | S |
| | 19 | 42 | 32 | 10 | C | S |
| | 20 | 33 | 29 | 4 | C | S |

Incidentally, Comparative Examples 4 to 8, 10 and 18 to 20, in which the dynamic surface tension at a lifetime of 50 milliseconds is relatively low show low image densities in particular on the PPC Paper 4024 (product of Xerox Co.) that is a recording medium having coarse texture and a lot of voids.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-331703, filed Nov. 16, 2005, and Japanese Patent Application No. 2006-307758, filed Nov. 14, 2006, which are hereby incorporated by reference herein in their entirety.

What is claimed is:

1. An aqueous ink comprising:
   water;
   a water-soluble organic solvent;
   a surfactant; and
   a coloring material,
   wherein the surfactant is a polyoxyethylene alkyl ether having a HLB value, as determined by the Griffin method, of 12.9 or more to 15.5 or less,
   wherein the content (mass %) of the surfactant is from 0.10 mass % or more to 0.75mass % or less based on the total mass of the aqueous ink,
   wherein a dynamic surface tension 25° C. at a lifetime of 50 milliseconds, as determined by a maximum bubble pressure method, is 49 mN/m or more, and
   wherein a dynamic surface tension 25° C. at a lifetime of 5,000 milliseconds, as determined by the maximum bubble pressure method, is 38 mN/m or less.

2. The aqueous ink according to claim 1, wherein a difference between the dynamic surface tension at a lifetime of 50 milliseconds and the dynamic surface tension at a lifetime of 5,000 milliseconds is 15 mN/m or more.

3. The aqueous ink according to claim 1, wherein the alkyl group in the polyoxyethylene alkyl ether has 12 to 18 carbon atoms.

4. The aqueous ink according to claim 1, wherein the coloring material is a self-dispersion pigment.

5. An ink jet recording method comprising ejecting an ink by an ink jet system to conduct recording on a recording medium, wherein the ink is the aqueous ink according to claim 1.

6. An ink cartridge comprising an ink storage portion for storing an ink, wherein the ink is the aqueous ink according to claim 1.

7. A recording unit comprising an ink storage portion for storing an ink and a recording head for ejecting the ink, wherein the ink is the aqueous ink according to claim 1.

8. An ink jet recording apparatus comprising an ink storage portion for storing an ink and a recording head for ejecting the ink, wherein the ink is the aqueous ink according to claim 1.

9. The aqueous ink according to claim 1, wherein the alkyl group of the polyoxyethylene alkyl ether is selected from the group consisting of a lauryl group, a cetyl group, and an oleyl group.

10. The aqueous ink according to claim 1, wherein the water-soluble organic solvent comprises 2-pyrrolidone.

* * * * *